US007448302B2

(12) United States Patent
Huang

(10) Patent No.: US 7,448,302 B2
(45) Date of Patent: Nov. 11, 2008

(54) ADAPTER COUPLING DEVICE

(76) Inventor: Daniel Huang, P.O. Box 697, Fongyuan City 420, Taichung County (TW)

( * ) Notice: Subject to any disclaimer, the term of this patent is extended or adjusted under 35 U.S.C. 154(b) by 0 days.

(21) Appl. No.: 11/703,629

(22) Filed: Feb. 8, 2007

(65) Prior Publication Data

US 2008/0190251 A1 Aug. 14, 2008

(51) Int. Cl.
*B25B 23/00* (2006.01)
*B23B 31/107* (2006.01)

(52) U.S. Cl. ......................... 81/438; 279/75; 81/177.85

(58) Field of Classification Search .................. 81/438, 81/436, 177.85; 279/22, 29, 39, 74, 75, 86, 279/905

See application file for complete search history.

(56) References Cited

U.S. PATENT DOCUMENTS 4,828,277 A * 5/1989 De Bastiani et al. .......... 279/22
5,934,384 A * 8/1999 Wang ...................... 81/177.85
6,270,085 B1 * 8/2001 Chen et al. .................... 279/22
6,325,393 B1 * 12/2001 Chen et al. .................... 279/22
6,637,755 B2 * 10/2003 Chen et al. .................... 279/22
6,973,858 B2 * 12/2005 Huang ...................... 81/177.85
7,159,493 B1 * 1/2007 Huang ......................... 81/438

* cited by examiner

*Primary Examiner*—Hadi Shakeri

(57) ABSTRACT

An adapter coupling device includes an adapter wrapped byan outer sleeve and biased by a large spring. The adapter has a polygonal recess in the upper portion, a circular recess under the polygonal recess for receiving a positioning block which is biased by a small spring, two pairs of the first and second radial through hole in upper and lower peripheries for engaging with two pairs of steel balls. The outer sleeve has an introrse upper portion which has an asymptotic inner wall, an annular groove in a middle inner wall and an annular flange on lower end, a screwdriver inserted into the polygonal recess of the adapter has a hexagon shank, a rhombic notch in each of the corners of the shank, when inserting the screwdriver into the adapter, the asymptotic wall of the sleeve is functioned to press the steel balls in the first radial through holes engaging within the rhombic notches of the shank so that the screwdriver is checked.

6 Claims, 19 Drawing Sheets

ADAPTER COUPLING DEVICE

BACKGROUND OF THE INVENTION

The present invention relates to hand tools and more particularly to an adapter coupling device into which a screwdriver is positioned by using one hand and without pulling an outer sleeve for the outer sleeve is automatically moving backward simultaneously with the inserting action of the screwdriver and utilizing the asymptotic line or arc surface principles to force a retaining means (a ball, a cylinder or a W-shaped ring larger than 180° circumference) gripping the screwdriver inside the adapter. When removes the screwdriver from the adapter, pushes the outer sleeve upward and stops it at a positioning place. The screwdriver is although still stayed within the adapter. But the user can pick it up from the adapter freely without moving the outer sleeve downward so as to prevent an inadvertently touching on the outer sleeve that causes the screwdriver breaking-off the adapter.

FIGS. 1 and 2 show "a pneumatic jaw structural improvement" which is a R.O.C. application, serial number 87210259 and comprises an outer sleeve 10 wrapping a large spring 11 and a hollow cylinder 12 inside which is a small spring 13 a cylindrical slider 14 an inner sleeve 15, etc., a C-shaped retaining ring 16 and (an upper cap 17 being used to secure the structure. The lower end of the hollow cylinder 12 has a tang 18 which is provided to connect the structure with a pneumatic machine. The large spring 11 may be in free state or under pressure. The hollow cylinder 12 has a pair of ball receiving slots 151 in opposing peripheries and the cylindrical slider 14 has a magnet 141 in the body for attracting a screwdriver 1. However, this product must move down the outer sleeve 10 preceding to assemble the screwdriver 1 to have the inner wall 101 of the outer sleeve 10 disengaged with the steel balls 102. It is inconvenient because it always need other person helping to finish this job.

FIGS. 3, 4, 5 show a U.S. Pat. No. 5,934,384 which comprises a cylindrical adapter 20 having a hexagon positioning recess 21, an outer sleeve 25 covering the adapter 20, a pair of concaved annular grooves 22 and 23 spacedly formed in outer peripheries. The annular groove 22 is wrapped by an arcuate plate 24 in the middle portion of which is a protruding plate 241 (as shown in FIG. 5) inserting into a through hole 221 of the annular groove 22, a C-shaped ring 231 wrapped in the annular groove 23 and biased by a spring 201 for providing the outer sleeve 25 upward sliding force, the inner wall of the outer sleeve 25 is a slope which is capable of pressing the arcuate plate 24 moving inward to having its protruding plate 241 stop against the rhombic grooves 5 of the shank of the screwdriver 4 which is secured in the adapter 20. When slides the outer sleeve 25 upward, the arcuate plate 24 is disengaged with the inner wall of the outer sleeve 25 and the protruding plate 241 is also disengaged with rhombic grooves 5 so that the screwdriver 4 is free to be removed from the adapter 20. However, the user has to move the outer sleeve 25 upward with one hand preceding to insert the screwdriver 4 into the adapter 20 with other hand that's very inconvenient, too. Further, in order to smoothly engage the protruding plate 241 into the rhombic grooves 5, it must be thinner than the thickness of the arcuate plate 24 so as to add the working steps. Moreover, if the protruding plate 241 is to process not so well, it would never insert into the annular grooves 22 that becomes defective product.

FIG. 6 shows a U.S. Pat. No. 3,767,218 which comprises a cylindrical adapter 30 wrapped with an inward camber sleeve 35 which has a lower end screwed on a lower cap 36, a polygon positioning recess 31 in the top of the adapter 30, a pair of large through holes 32 and a pair of small through holes 33 spacedly and symmetrically formed in the opposing walls of the recess 31 for respectively pressing in a pair of large steel balls 321 and a pair of small steel balls 331, a C-shaped ring 34 stopping against a spring 301 to enable the sleeve 35 elastically moving downward. When the sleeve 35 slides downward, the large and small steel balls 321 and 331 are pressed in to stop against the screwdriver 6 inside the positioning recess 31. When the sleeve 35 moves upward, the steel balls 321 and 331 move outerward to set the screwdriver 6 free and removable from the positioning recess 31. This patent has the same disadvantage that the user has to help by other person to engage or disengage the screwdriver 6 with the positioning recess 31 that's also inconvenient.

FIGS. 7 and 8 show a U.S. Pat. No. 6,311,989 which comprises a cylindrical adapter 40, an outer sleeve 45 having a introrse upper portion 451, a hexagon positioning recess 41 in upper portion of the adapter 40, two through holes 42 and 43 in opposing peripheries of the recess 41 of different heights, a steel ball 421 desposed in the through hole 42, a steel ball 431 in the through hole 43, a retaining ring 44 desposed between the adapter 40 and the sleeve 45 for stopping against a spring 401 so that the sleeve 45 is elastic. When the sleeve 45 slides downward, its introrse upper portion 451 presses the steel ball 421 to enter into an annular groove 3 of a screwdriver 1, the steel ball 431 stopped against an outer periphery of the screwdriver 1. When slides the sleeve 45 upward, its introrse upper portion 451 is no longer stopped against the steel balls 421 and 431 so that the screwdriver 1 is removable. This patent has a disadvantage that the screwdriver must have an annular groove or a notch in periphery, other type of the screwdrivers are unsuitable. If the user puts the box upside down, the screwdriver 1 will automatically breaking-off because it is in the state of removability.

FIG. 9 shows a German Patent No. 102004011579A1 which comprises a cylindrical adapter 50, an outer sleeve 55 having an introrse upper portion wrapped on the adapter 50, a polygonal recess 51 in the top of the adapter 50, a pair of large through holes 52 and a pair of small through holes 53 of different height in opposing peripheries of the recess 51, a retaining ring 54 on an outer periphery of the adapter 50 stopped against a triangular annular convex 502, a spring 501 on lower outer periphery of the adapter 50 for providing electricity to the adapter 50, when slides the sleeve 55 downward, the steel balls 521 and 531 stop against the screwdriver so that the screwdriver 1 is securely positioned in the polygonal recess 51. When slides the sleeve 55 upward, the steel balls 521 and 531 are automatically broke away from the screwdriver 1 which is in the state of removal. This patent has the same disadvantage as the above described prior arts. They all use an outer sleeve of introrse surface or plane surface pressing the steel balls without any change. All of them have same disadvantage of unable to insert the screwdrivers into the positioning recess with one hand and no the function of temporarily keeping the screwdriver stable so that if inadvertently touch or knock the outer sleeve will cause the breaking-off of the screwdriver.

Another R.O.C. Patent No. 92219566, titled "screwdriver box pick up and engagement structure improvement" (as show FIGS. 10 and 11) comprises an axle rod 60, a bushing 61 on the upper periphery, an attracting element 62. The axle rod 60 further has a positioning recess 63 for receiving a screwdriver 4 therein, a slot 64 in a periphery of the positioning recess 63 abutting the bushing 61 which has a ball hole 65 incorporation with the slot 64, a shoulder 671 inside the sleeve 67 stops against the top of the steel ball 66, a spring 68, the bushing 61 and the sleeve 67, an attracting element 62 is composed of a spring 621 and a magnet 622 which positioned in the lower portion of the axle rod 60 and is a element simultaneously having the attaching and elastic function. Whereby, the screwdriver 4 can easily and stably insert into the positioning recess 63 or picking up or change a new one all with one hand. When the screwdriver 4 is inserted into the positioning recess 63, it presses the spring 621 retreated and be attracted by the magnet 622. When the screwdriver 4 releases the spring 621, the spring 68 with resilient force to put the screwdriver 4 slightly out of the positioning recess 63 but still attracted by the magnet 622 for easily to pick up without breaking-off. This patent has an advantage to permit the user to insert the screwdriver 4 into the positioning recess 63 without sliding the sleeve 67 but only the movement of the bushing 61, the spring 68, the ball 66, the magnet 63 and the spring 621. To comparison with the present invention, you can find their apparent difference because the steel balls in the present invention don't move up and down. Besides there is no bushing used in present invention.

Further, a U.S. Pat. No. 7,063,332 (same as the German Patent No. DE10254339 and the R.O.C. Patent No. 92219566) in comparison with the above discussed R.O.C. Patent No. 92219566 (as shown in FIGS. 11 and 12) you will find they are similar in most of the structure. They are utilize a spring means directly stopping against the steel balls and without a bushing. The user although can insert the screwdriver with one hand. The spring means displaces but not the sleeve. When the screwdriver becomes removable it still attracted by the magnet and not breaking-off. In comparison with the R.O.C. Patent No. 92219566, they have the same disadvantages.

SUMMARY OF THE PRESENT INVENTION

The present invention has a main object to provide an adapter coupling device into which an user can insert a screwdriver with one hand but without sliding an outer sleeve up or downward and utilizes the asymptotic line (or arc surface) of the outer sleeve's pressing wall to press the checking member for desposing the screwdriver inside the adapter. When remove the screwdriver, push the outer sleeve upward to a positioning point without any movement or continuous push power. Where the screwdriver is still stayed in the adapter. Even if the tool is put upside down, the screwdriver will not drop down, while the user can remove it out of the adapter with one hand. This arrangement aims to prevent the screwdriver breaking-off by inadvertently collision.

Another object of the present invention is to provide an adapter coupling device which provide a checking means suitable to check the plane surface or the rhombic line of the hexagon screwdriver.

Further object of the present invention is to provide an adapter coupling device which provide a W-shaped ring larger than 180° circumference checking the screwdriver in the adapter. When loosens the screwdriver, the W-shaped rod still checks the screwdriver without breaking-off.

Accordingly, the adapter coupling device of the present invention comprises:

an adapter having a polygonal recess in the top for receiving a screwdriver therein, at least a radial hole for passing through a checking means, at least a radial hole in a lower portion thereof for entering a steel ball, a cylindrical groove under the polygonal recess into which is a spring means and a positioning block. The lower portion of the positioning block is a conical surface facing to the radial hole;

an outer sleeve wrapped on the adapter, a spring means in a lower portion biased between the sleeve and the adapter. The outer sleeve has an introrse upper portion inside which is a asymptotic (or arcuate) surface, an annular groove in an inner wall facing to the lower radial hole of the adapter. The inner wall of the sleeve presses the steel ball into the conical surface of the positioning block so as to secure the sleeve and the positioning block;

Thereby, a user can insert the screwdriver and secure it into the adapter with one hand only without pushing the sleeve upward but it will retreat together with insertion action of the screwdriver. Meanwhile, the asymptotic surface press the checking means moving inward to fix the screwdriver inside the adapter. When push the sleeve upward to a positioning point and release the sleeve, the screwdriver is although still secured inside the adapter, but the user can easily remove the screwdriver from the adapter.

The present invention will become more fully understood by reference to the following detailed description thereof when read in conjunction with the attached drawings.

DETAILED DESCRIPTION OF THE PREFERRED EMBODIMENT

Figure 2:
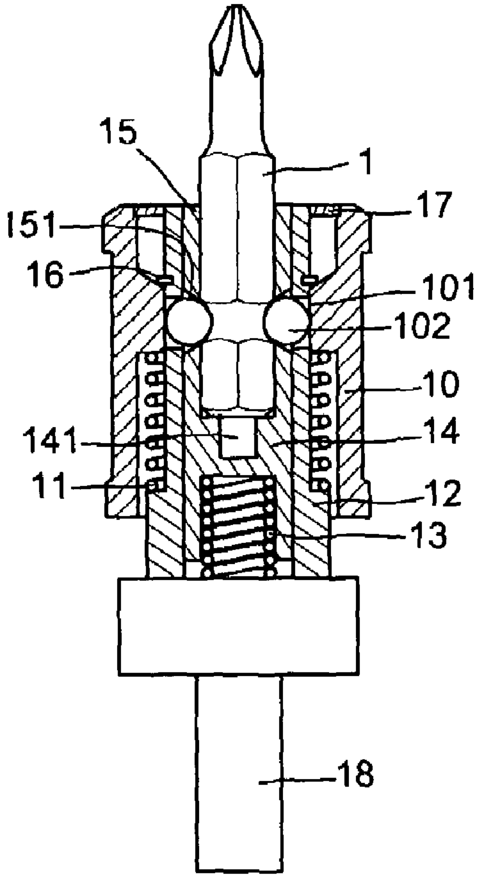
FIG.2 Prior Art
FIG. 2 is a sectional view to show the adapter coupling device of FIG. 1 in operation.
Figure 1:
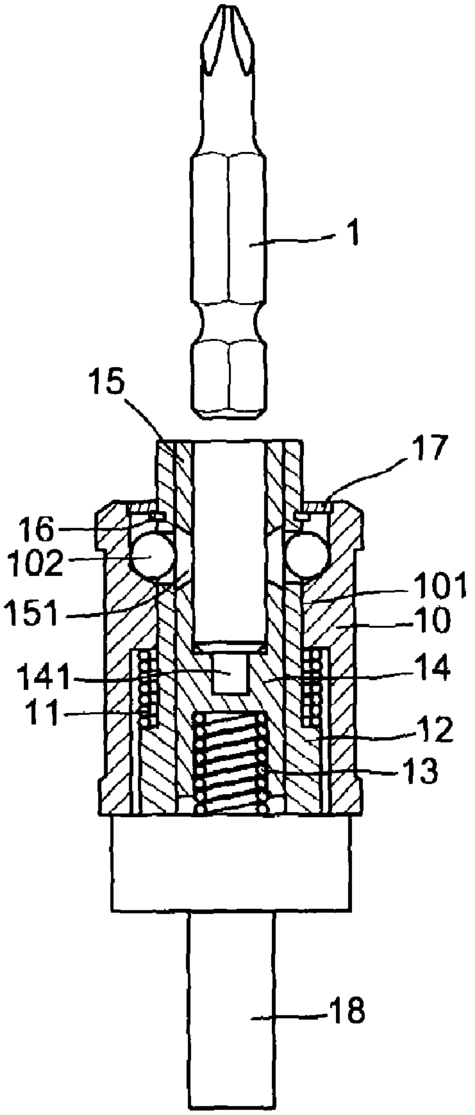
FIG.1 Prior Art
FIG. 1 is a sectional view to show an adapter coupling device according to a R.O.C. Patent No. 87210259.

With reference to the drawings and initiated from FIGS. 12 to 16, the adapter coupling device of the preferred embodiment of the present invention comprises a cylindrical adapter 70 and an outer sleeve 71 wrapped on the adapter 70. The adapter 70 has a polygonal recess 74 (generally a tetragon or hexagon) in upper portion for inserting a screwdriver 4, a cylindrical recess 75 under the polygonal recess 74 communicating with each other, a pair of radial through holes 72 symmetrically formed in opposing upper peripheries for receiving a pair of steel balls 73 therein, a pair of radial through holes 78 symmetrically formed in the opposing peripheries of the cylindrical recess 75 for receiving a pair of another steel balls 781, a spring 761 disposed in the bottom of the cylindrical recess 75 for biasing a cylindrical positioning block 76, the lower portion of which is a conical outer periphery 762 including an upper slope 7621 and a lower slope 7622, a lower cylindrical groove 765 for receiving the spring 761. The adapter 70 has a tang at lower end for connecting a handle (not shown) and a shoulder 701 on the top of the tang for biasing a spring 77 in order to provide elasticity to the outer sleeve 71 which has an introrse upper portion 712 inside which is a asymptotic line or an arcuate surface (not a slope). The outer sleeve 71 has a diameter more larger and larger from the top to the lower end and an annular groove 713 in a lower inner wall about facing to the ball 781, a plane surface 714 and an annular flange 711 on the lower end sliding upon the tang.

Figure 13:
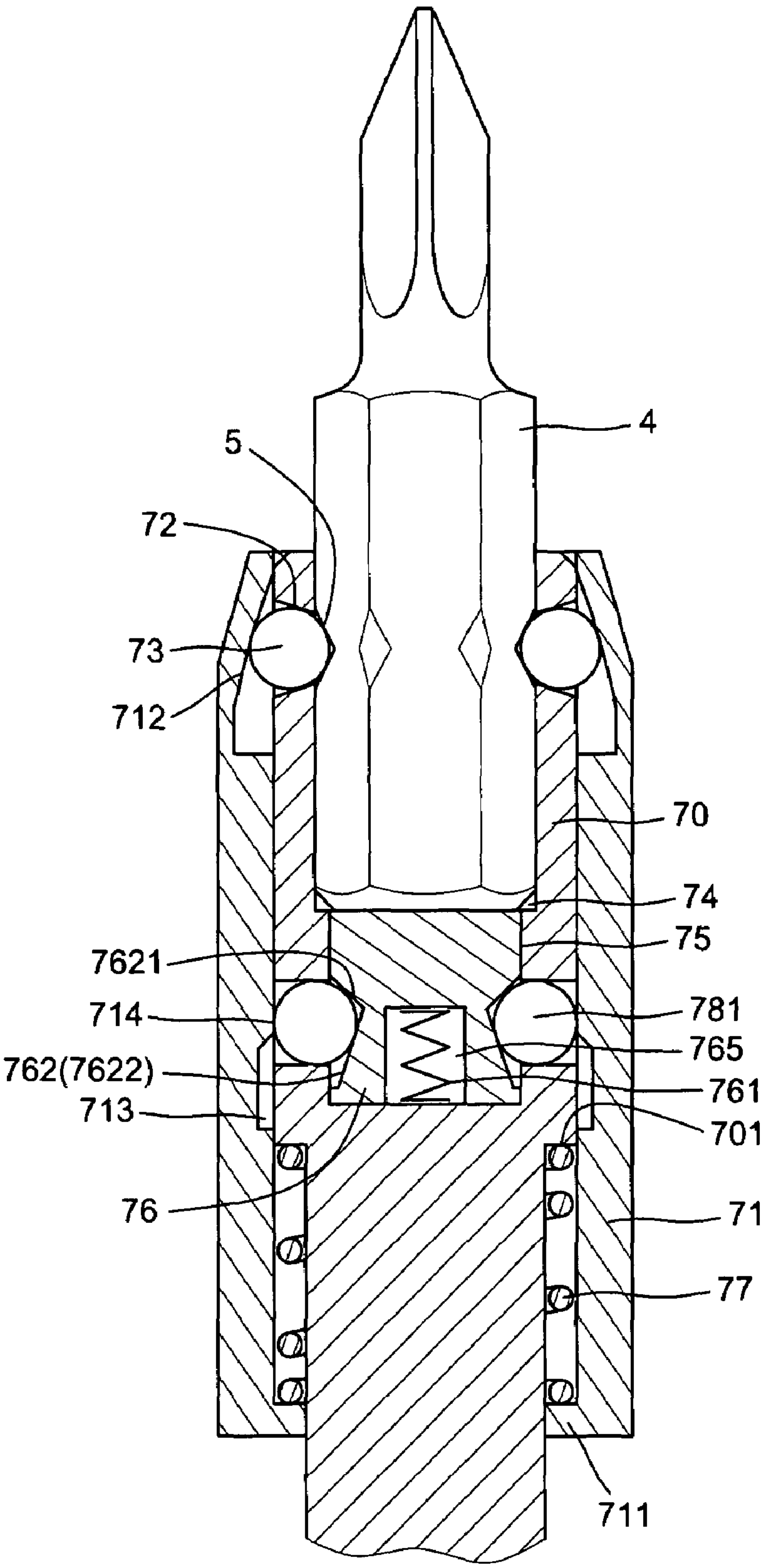
FIG. 13 is a sectional view to show the assembly of FIG. 12.
Figure 14:
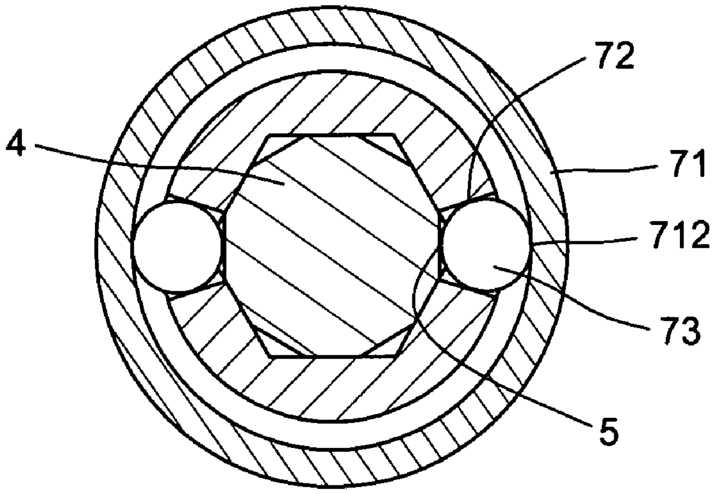
FIG. 14 is a cross section to show the screwdriver being pressed by a pair of steel balls.
Figure 15:
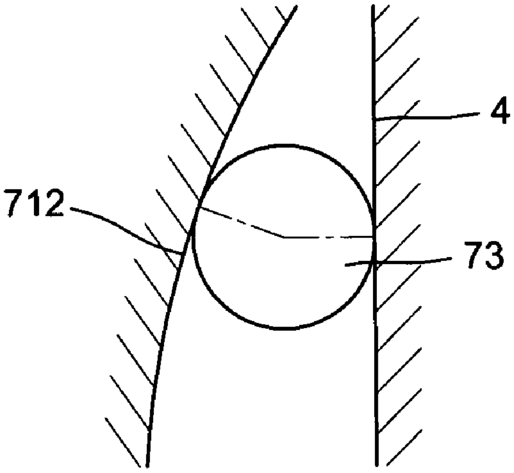
FIG. 15 is a sectional view to show that a steel ball is positioned between the asymptotic surface of the sleeve and the outer periphery of the screwdriver.
Figure 16:
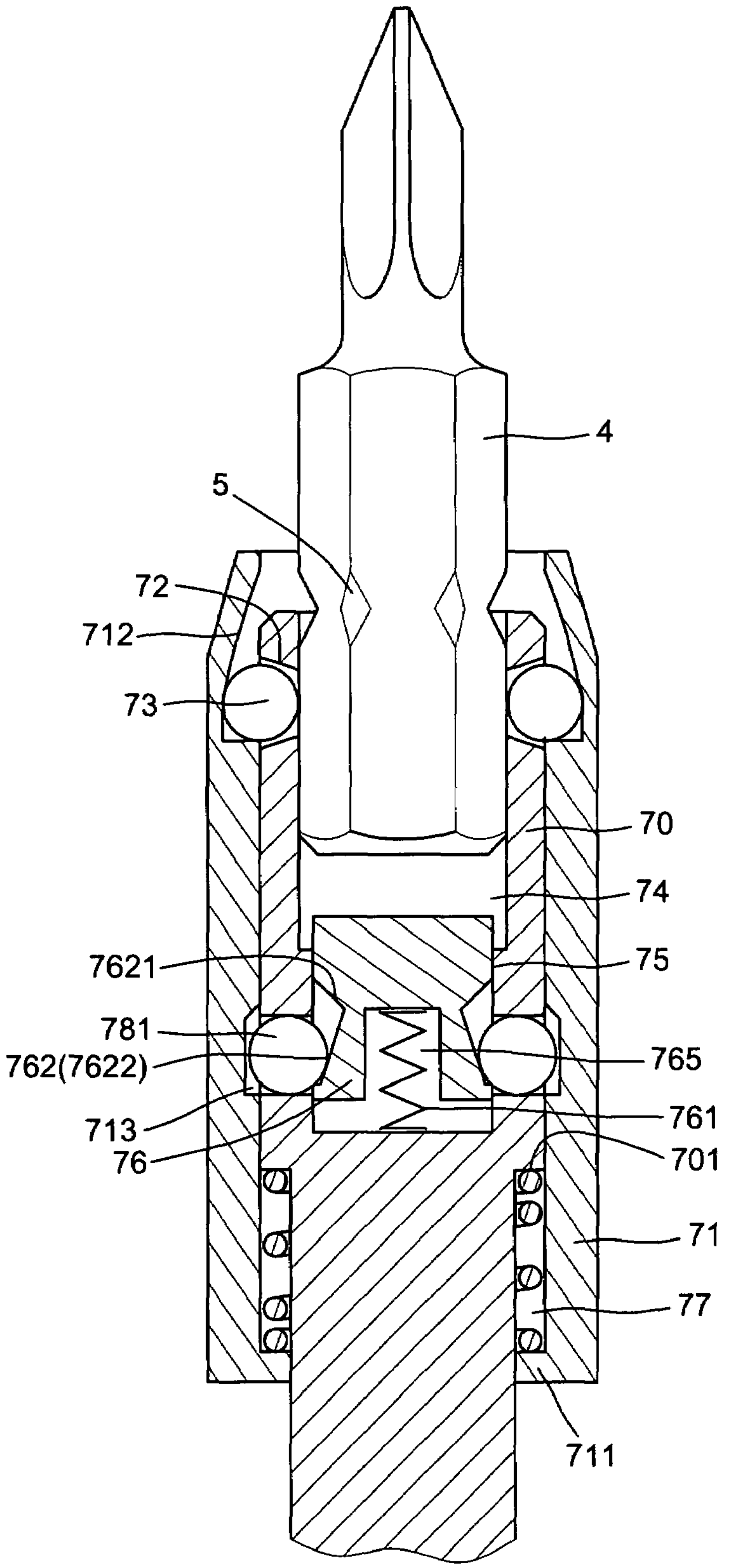
FIG. 16 is a sectional view to show that the screwdriver is about to lease the adapter but temporarily defined by the sleeve.

Referring to FIG. 13, in operation, the user is able to insert the screwdriver 4 into the polygonal recess 74 of the adapter 70 (the bottom of the screwdriver 4 reaches to a position between the polygonal recess 74 and the circular groove 75), the outer sleeve 71 slightly moves backward with same direction of the inserting action of the screwdriver 4 without pushing upward. When the bottom of the screwdriver 4 is deeply inserted, the positioning block 76 is pressed to move down to the bottom of the circular groove 75 such that the steel balls 781 is engaged within the triangular concave 762 and stopped between the upper cant 7621 and the lower cant 7622.

Meanwhile, the outer sleeve 71 moves downward by the downward movement of the spring 77, its inner wall 714 presses the steel balls 781 moving inward, the introrse portion 712 of the outer sleeve 71 also presses the steel balls 73 in the radial hole 72 of the adapter 70 moving inward to check the rhombic notches 5 of the screwdriver 4 which is now completely fixed in the adapter 70.

Figure 11:
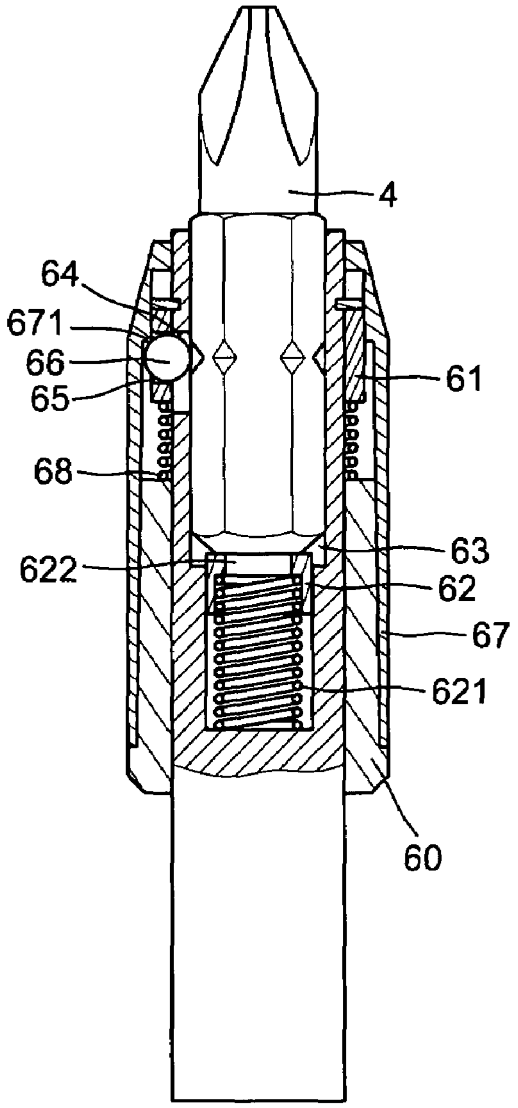
FIG. 11 Prior Art
FIG. 11 is a sectional view of FIG. 10 to show that a screwdriver is already positioned in the adapter.
Figure 10:
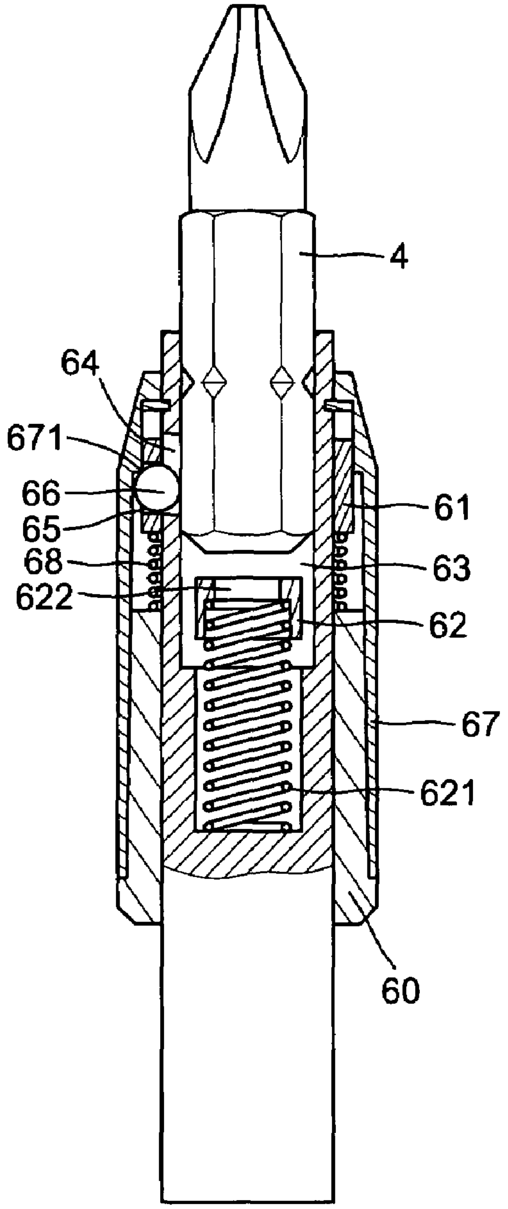
FIG. 10 Prior Art
FIG. 10 is a sectional view to show an adapter coupling device according to a R.O.C. Patent No. 92219566.
Figure 12:
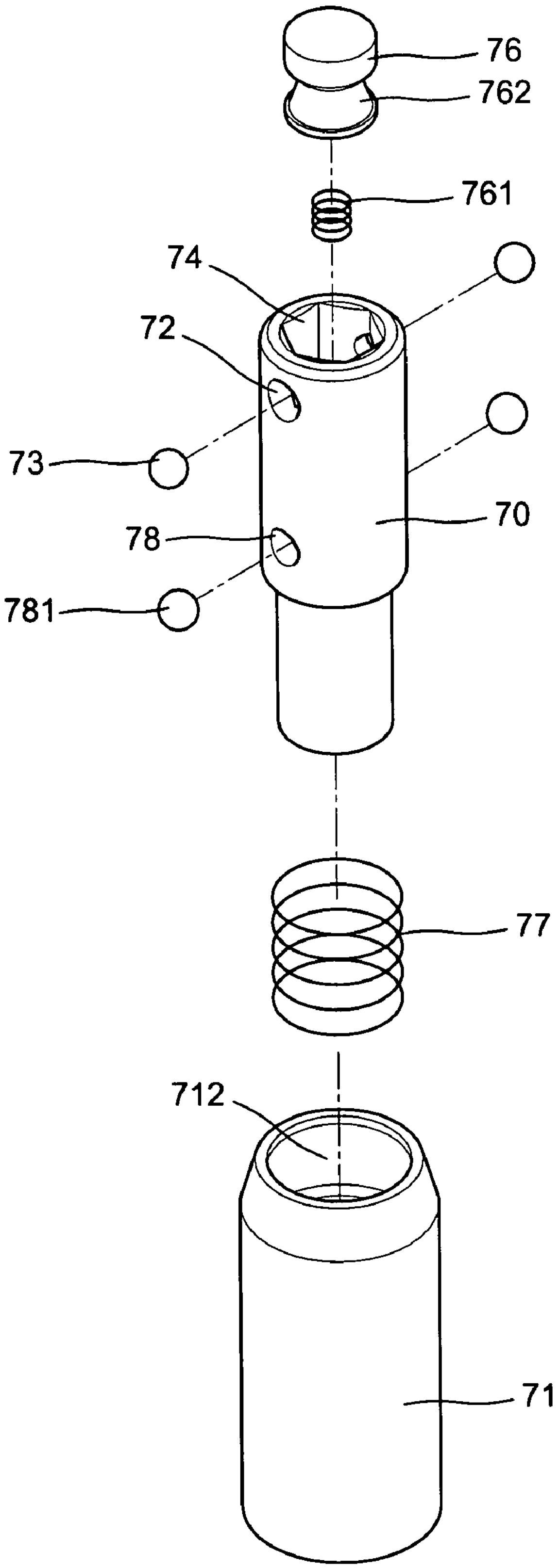
FIG. 12 is an exploded perspective view of the preferred embodiment of the adapter coupling device according to present invention.

During the above process, there is no any manual movement on the outer sleeve 71. It is very different from the prior art showing in FIGS. 10 and 11.

When remove the screwdriver 4 from the adapter 70, just pushing up the outer sleeve 71 in corporation with the resilient force of the springs 77 and 761, the steel balls will automatically retreat from the triangular concave 762 and rhombic notches 5, the screwdriver 4 is although set free but still slightly gripped by the steel balls 73 and 781 so that the screwdriver 4 will not drop down if put the adapter 70 upside down. However, the user is able to easily removing the screwdriver 4 from the adapter 70 by one hand. This clever arrangement is different from the prior art of the U.S. Pat. No. 7,063,332.

Figure 17:
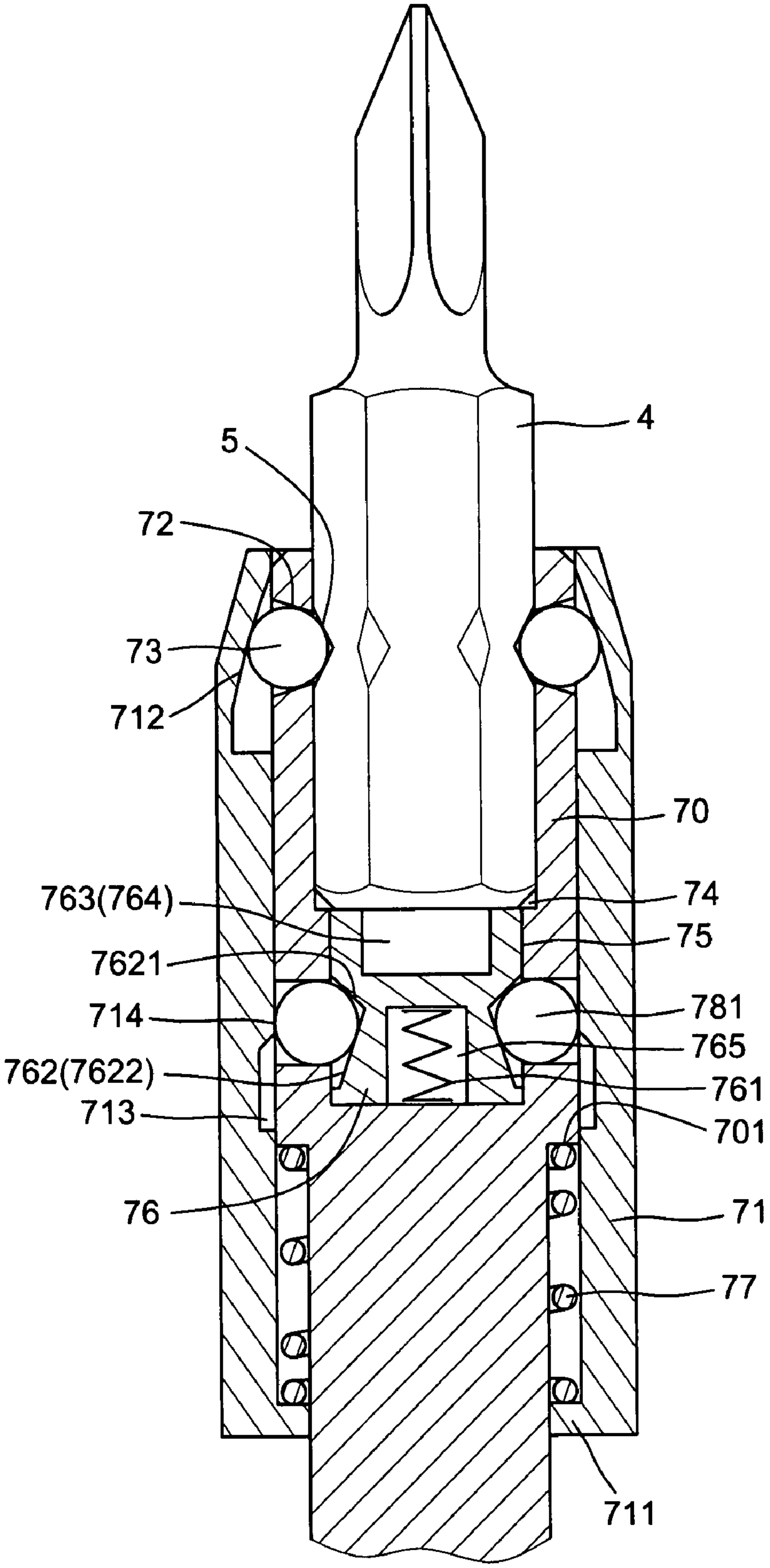
FIG. 17 is a sectional view to show an alternate arrangement for the positioning block in which a newly formed circular recess with a magnet disposed therein.

Referring to FIG. 17, an alternate arrangement is provided. In this arrangement a circular groove 763 is formed in the top of the positioning block 76 and a magnet 764 is inlaid in the groove 763. When push up the outer sleeve 71, thought the steel balls 73 and 781 still slightly grip the screwdriver 4, but the magnet 764 also attracts the bottom of screwdriver 4 to prevent the screwdriver 4 from suddenly dropping out.

The screwdriver 4 of the present invention has a hexagon shank and each angle of the hexagon has a rhombic notch 5 for receiving the steel balls 73.

Figure 22:
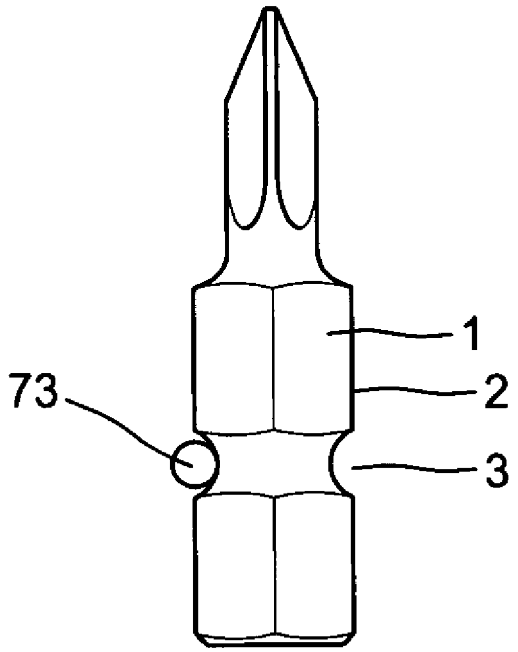
FIG. 22 is a perspective view to show that the screwdriver is checked by a steel ball.
Figure 23:
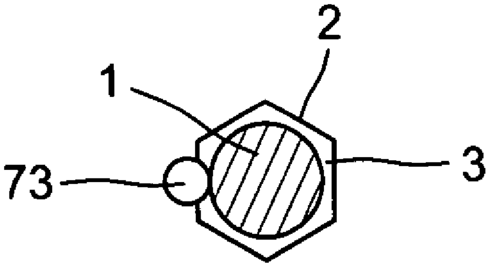
FIG. 23 is a cross section of FIG. 22.

FIGS. 22 and 23 show a screwdriver 1 which has also a hexagon shank 2. But an annular groove 3 is formed instead of the rhombic notches to receiving the steel balls 73.

Figure 24:
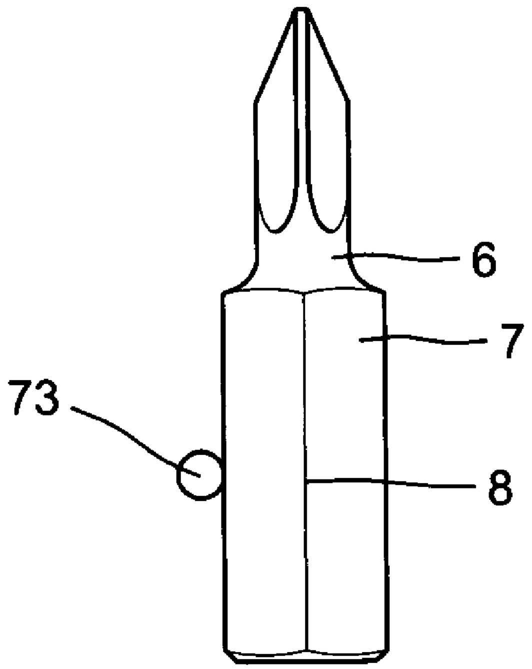
FIG. 24 is a perspective view to show that a screwdriver is checked by a steel ball.
Figure 25:
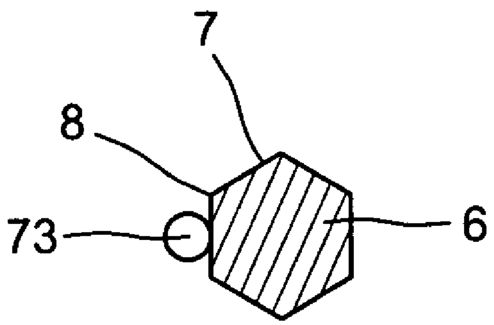
FIG. 25 is a cross section of FIG. 24.

FIGS. 24 and 25 show another hexagon shank screwdriver 6. No rhombic notch 5 or annular groove 3 are formed so that the steel balls only check against the surface of the hexagon shank 2.

Thus, the asymptotic surface of the urgent wall 712 of the outer sleeve 71 is suitable to different design of the screwdriver 1, 4 and 6 which will not drop down even the sleeve 71 is loosened and puts upside down.

Figure 18:
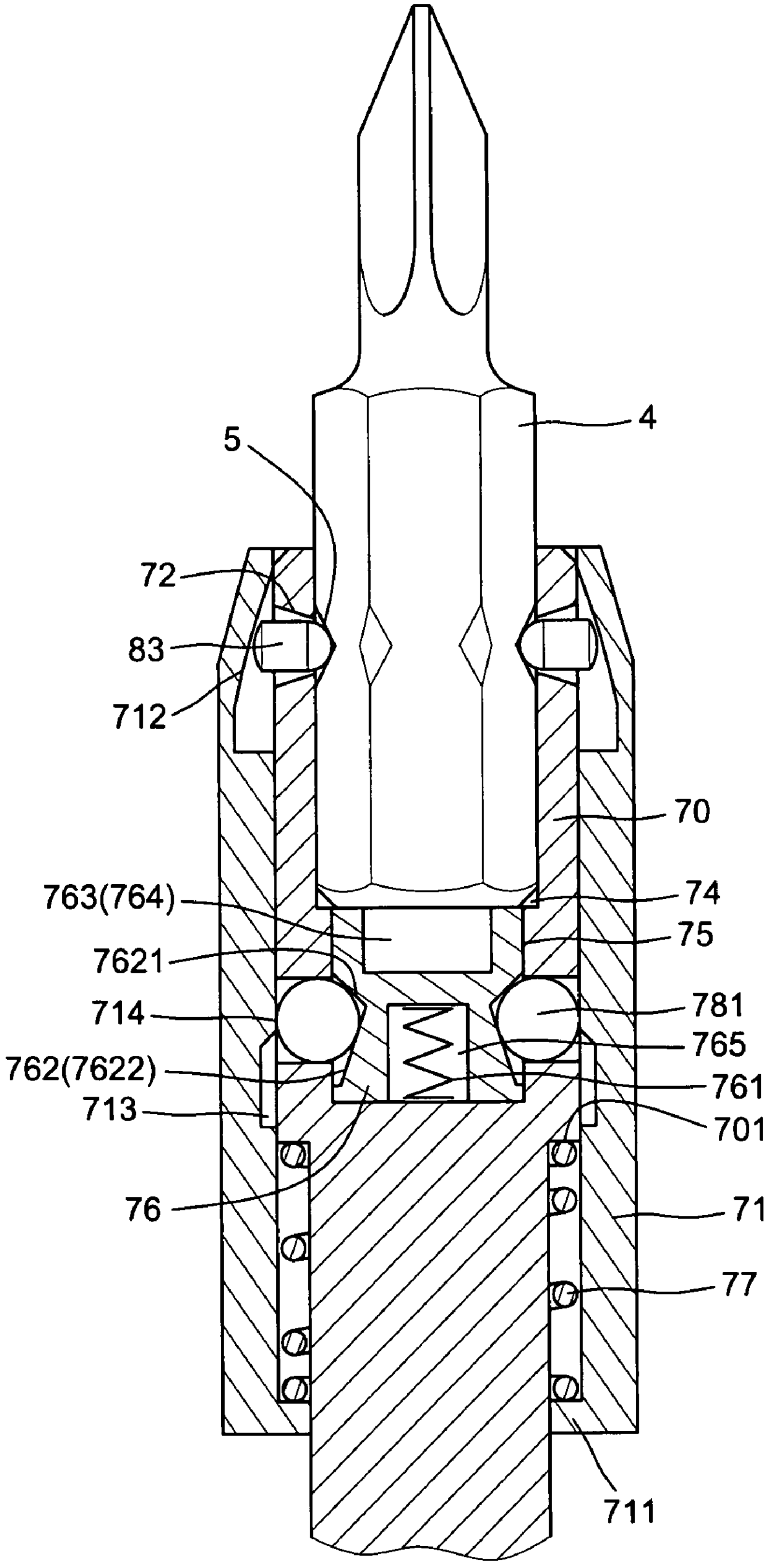
FIG. 18 is a sectional view to show another alternate arrangement that is replaced a pair a steel balls with a pair of bullet-shaped checking means.

FIG. 18, shows another alternative arrangement which uses a pair of bullet-shaped check means instead of the steel balls 83, the inner end of this check means has a small arc and the outer end has a big arc. Utilize the asymptotic line of the urgent wall 712 of the outer sleeve 71 to press or to loosen the bullet-shaped check means 83 in the adapter 70 to positioning the screwdriver 4 in its rhombic notches 5 that the above discussed function is also achieved.

Figure 19:
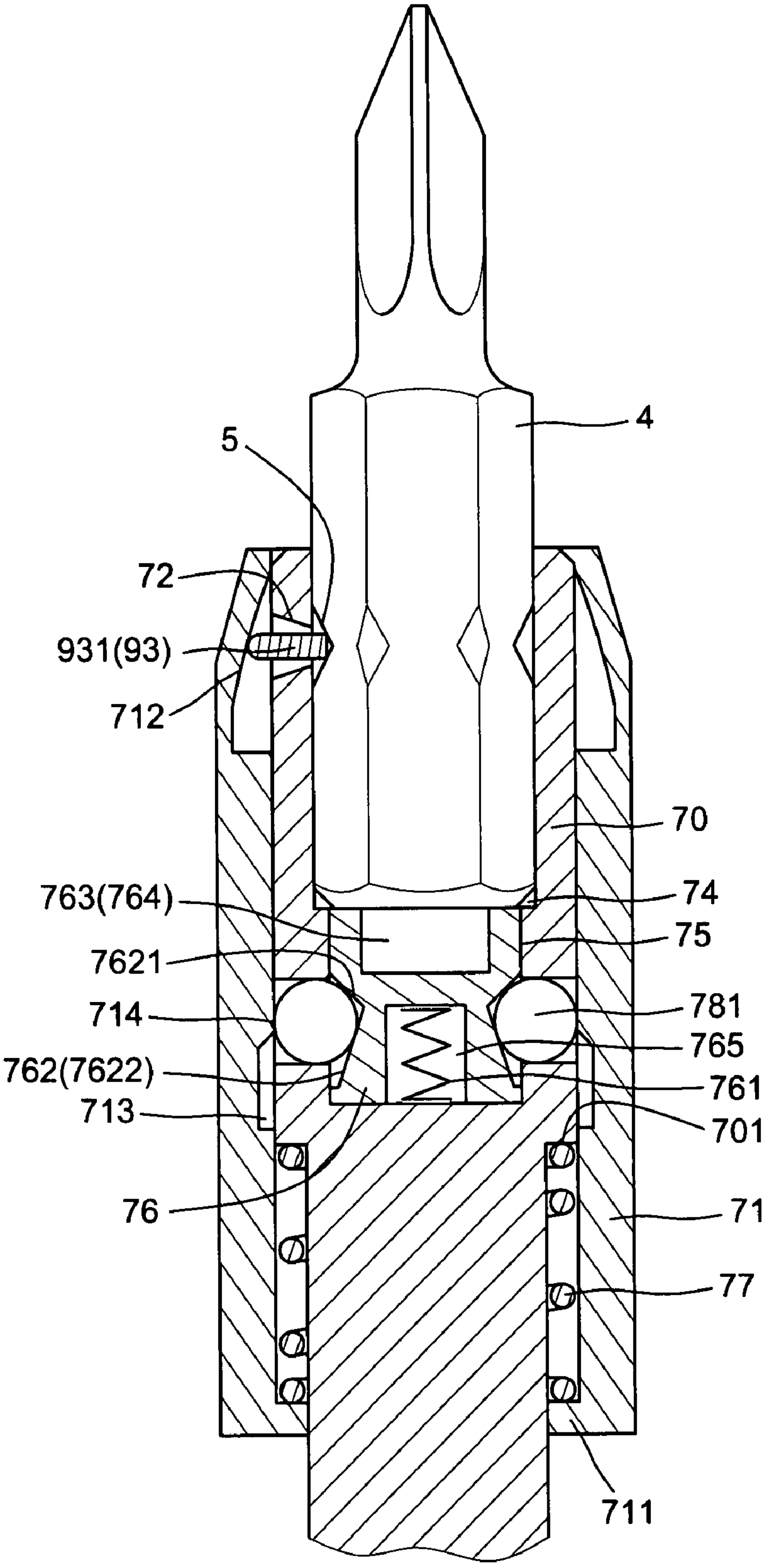
FIG. 19 is a sectional view to show a still another alternate arrangement of the bullet-shaped checking mean which is replaced with W-shaped checking means.
Figure 20:
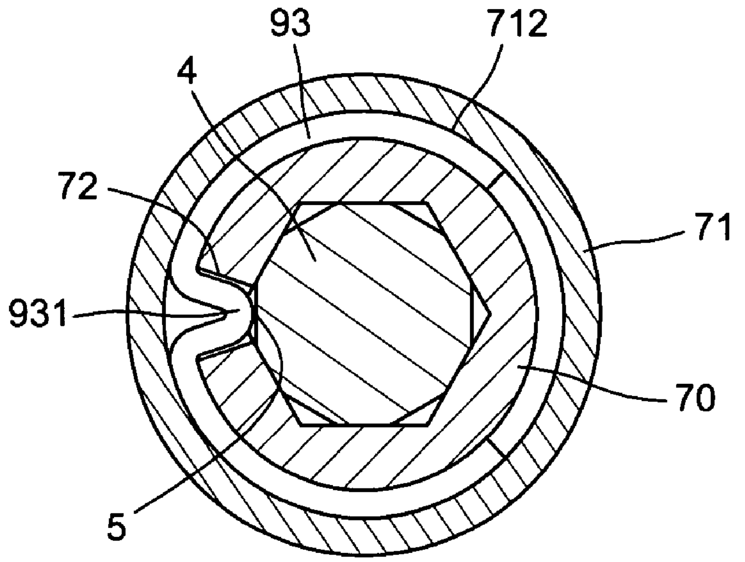
FIG. 20 is a cross section to manifest the W-shaped checking means stopping against a screwdriver.
Figure 21:
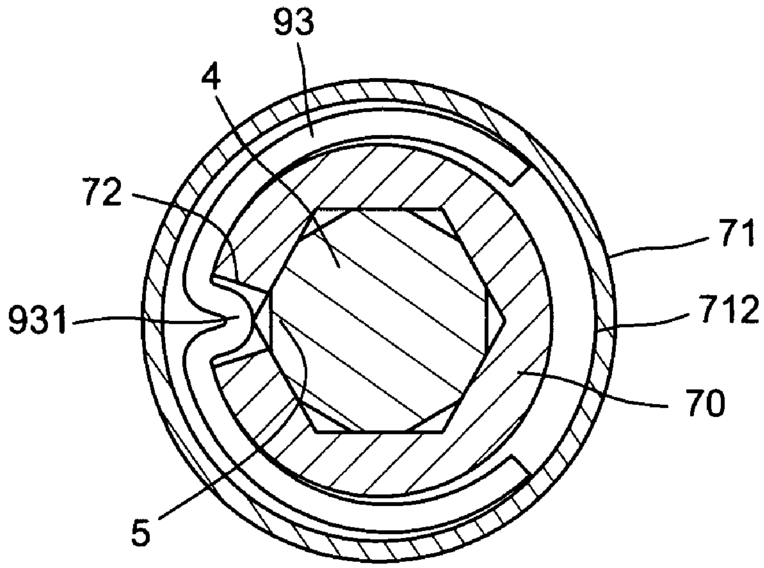
FIG. 21 is a cross section to show that the W-shaped checking means is left from the screwdriver.

Referring to FIGS. 19, 20 and 21, still another alternative arrangement is shown which uses a W-shaped ring 93 instead of the bullet-shaped check means 83. This W-shaped ring has a circumference large than 180 degrees and a V-shaped retaining means 931 at a middle portion engageable with the first radial through holes 72 of the adapter 70. The W-shaped ring 93 is elastic.

In operation, utilize the urgent wall 712 to press or to loosen the W-shaped ring 93 to force the V-shaped check means 931 to stop against the rhombic notch 5 of the screwdriver 4. When push the sleeve 71 upward, the V-shaped check means 931 is still slightly checking the screwdriver 4 so that the W-shaped ring 93 achieves the same function as discussed the above.

Figure 3:
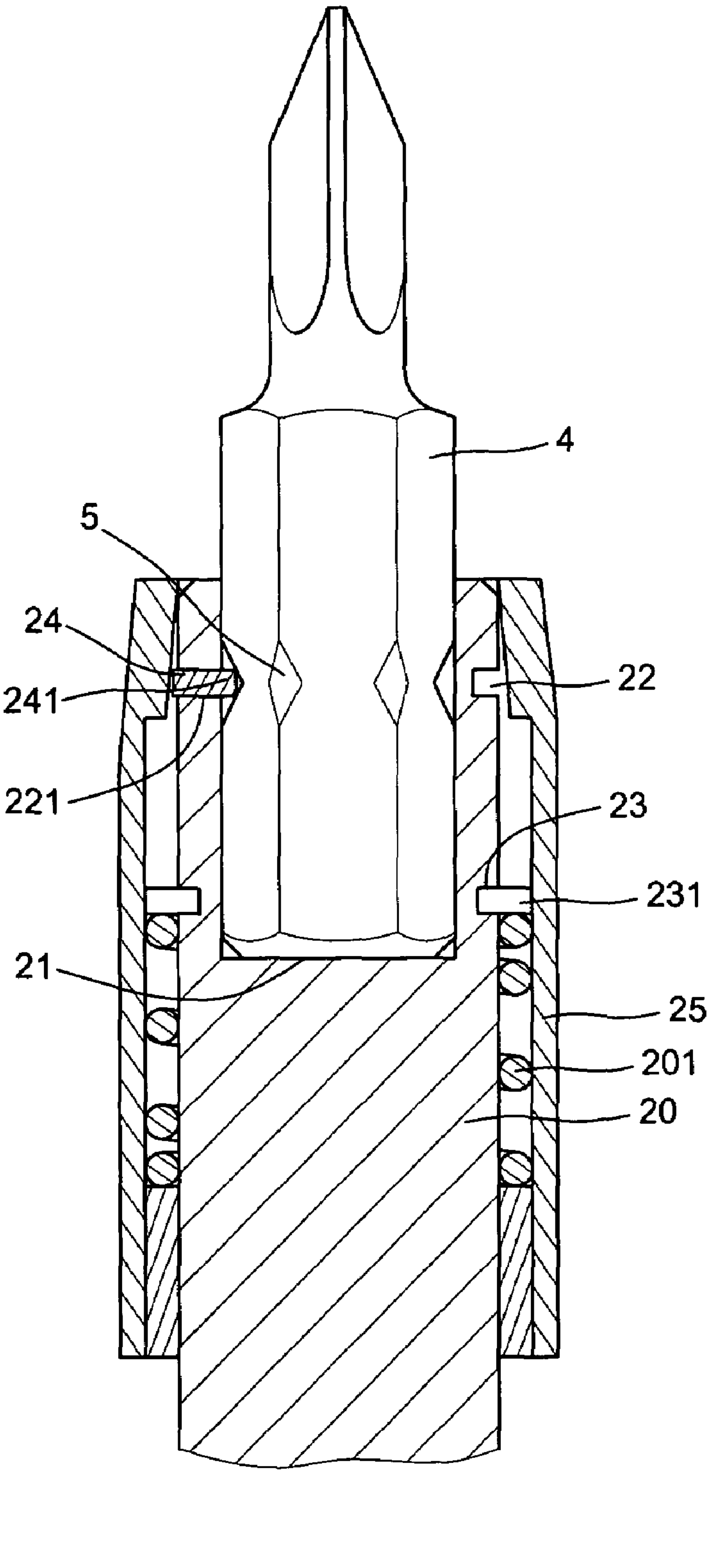
FIG.3 Prior Art
FIG. 3 is a sectional view to show an adapter coupling device according a U.S. Pat. No. 5,934,384.
Figure 4:
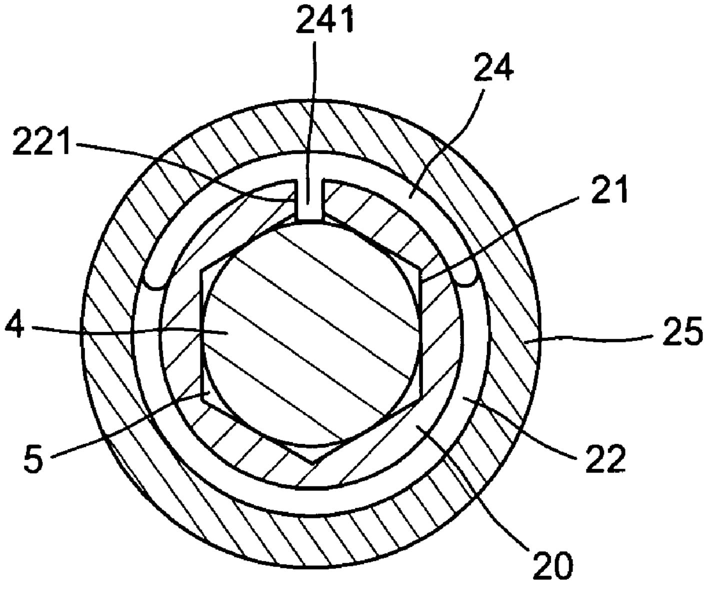
FIG.4 Prior Art
FIG. 4 is a cross section of FIG. 3.
Figure 5:
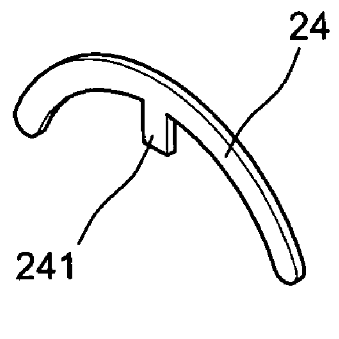
FIG.5 Prior Art
FIG. 5 is a perspective view to show a arc plate of the U.S. Pat. No. 5,934,384.
Figure 6:
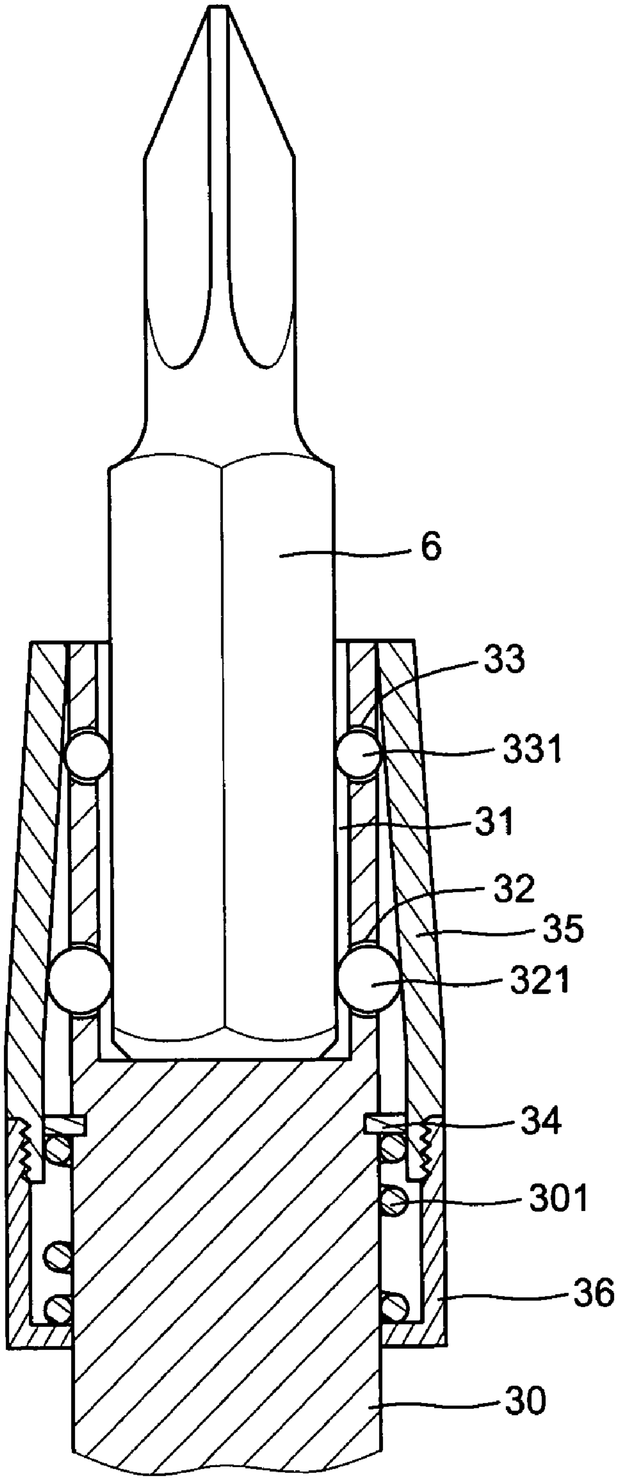
FIG.6 Prior Art
FIG. 6 is a sectional view to show an adapter coupling device according a U.S. Pat. No. 3,767,218.
Figure 7:
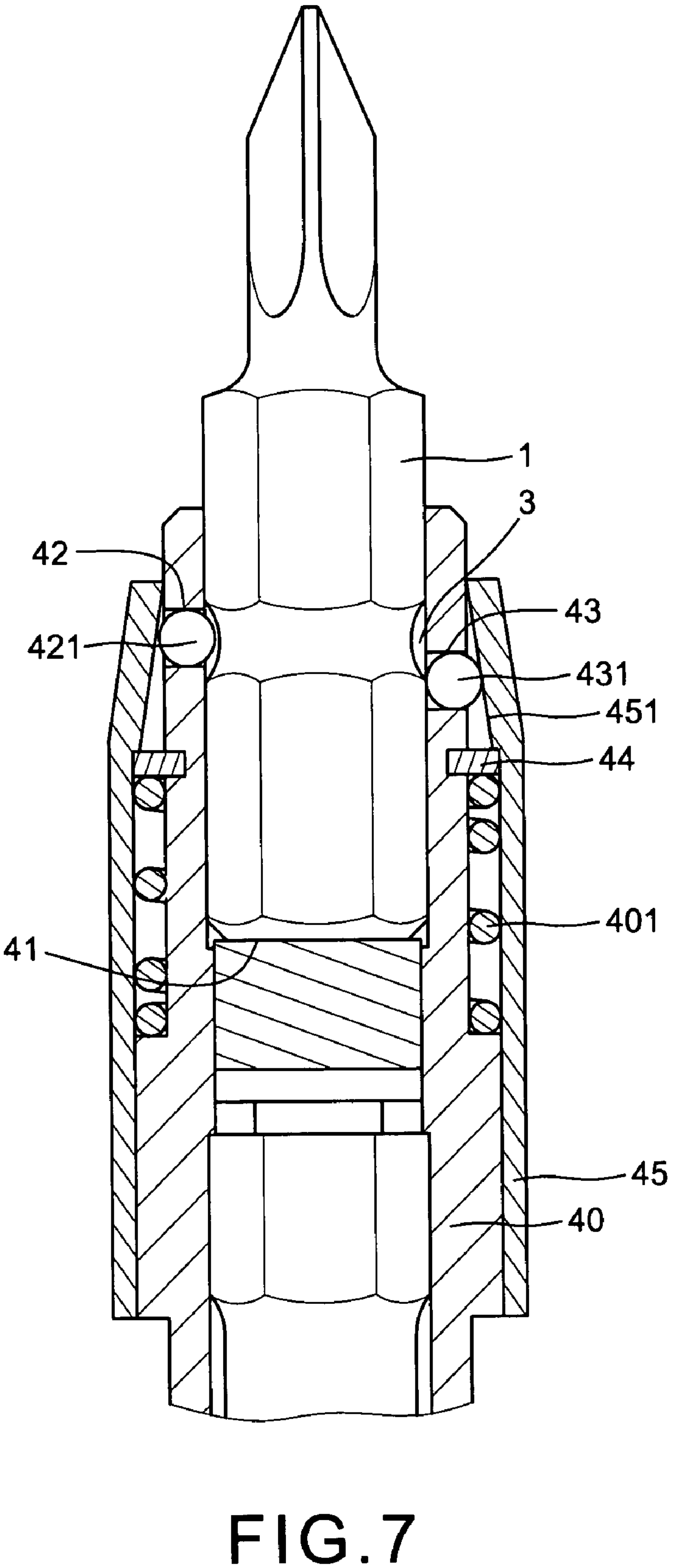
FIG.7 Prior Art
FIG. 7 is a sectional view to show an adapter coupling device according to a U.S. Pat. No. 6,311,989.
Figure 8:
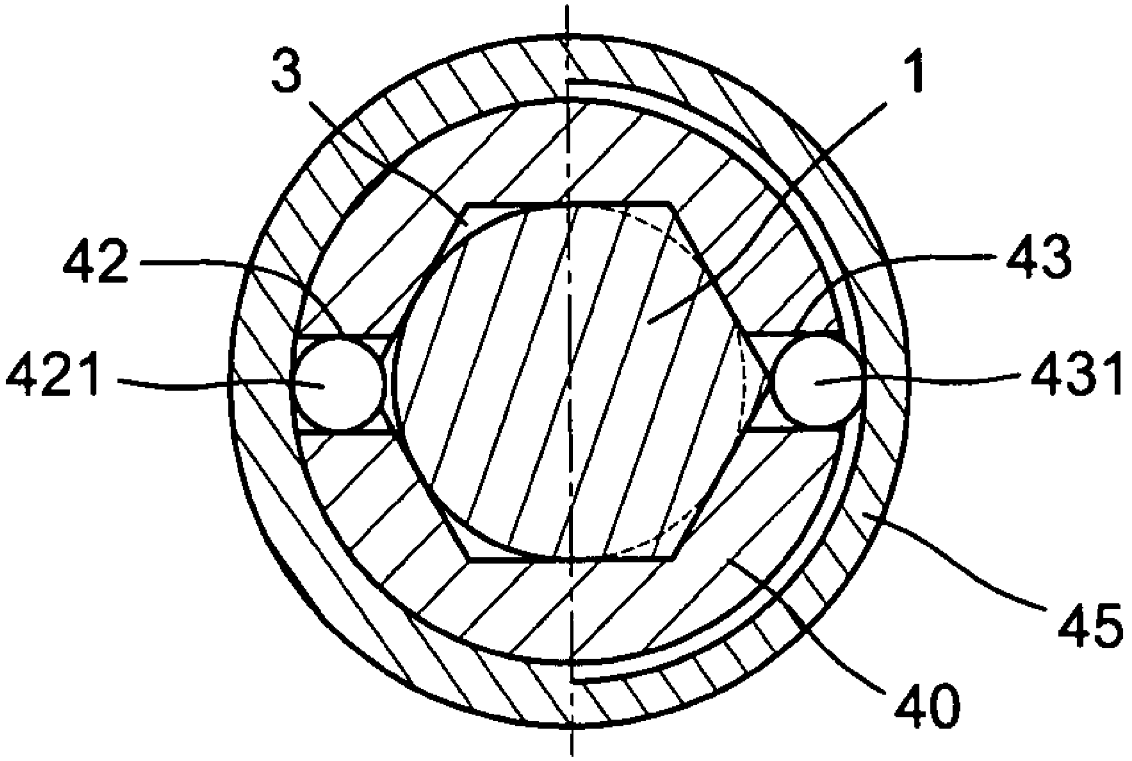
FIG.8 Prior Art
FIG. 8 is a cross section of FIG. 7.
Figure 9:
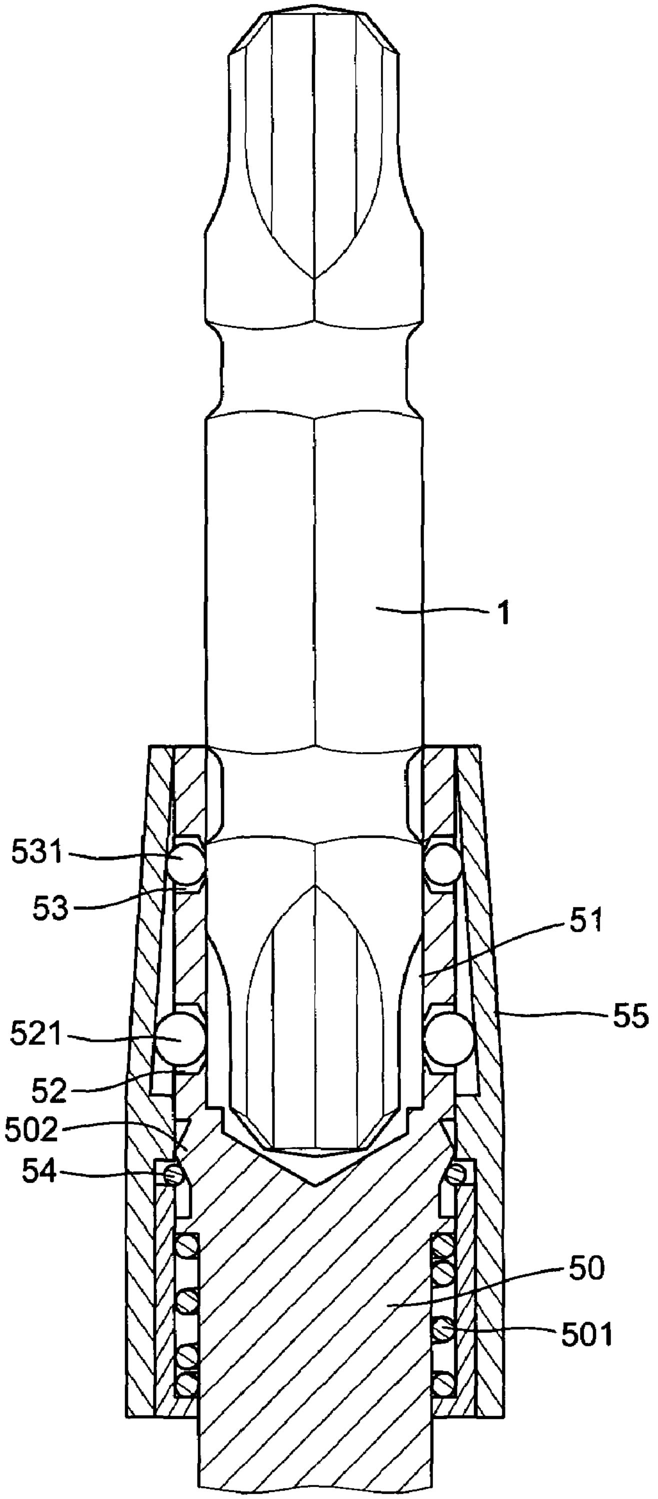
FIG.9 Prior Art
FIG. 9 is a sectional view to show an adapter coupling device according to a German Patent No. DE102004011579.

The W-shaped ring 93 of this arrangement is different from the arc plate 24 of the U.S. Pat. No. 5,934,384 (as shown in FIGS. 3, 4 and 5). Because the W-shaped ring 93 has a circumference larger than 180 degrees and elastic which is made of a cylindrical wire and has the following advantages:

1) its circumference large than 180 degrees and has elasticity. When the screwdriver is in loose state, it can be temporarily fixed (the check means 931 is still touched the screwdriver) and not broke-off even the screwdriver 4 is put upside down;

2) the check mean 93 is made of cylindrical elastic wire, there is no matter to care its thickness.

The above arrangements are suitable to the screwdrivers 1 or 4 (as shown in FIGS. 22, 23, 24 and 25). All of them have an annular groove or rhombic notch. They all be able to positioning or loosening the screwdriver 1 or 4 in the adapter 70.

Figure 26:
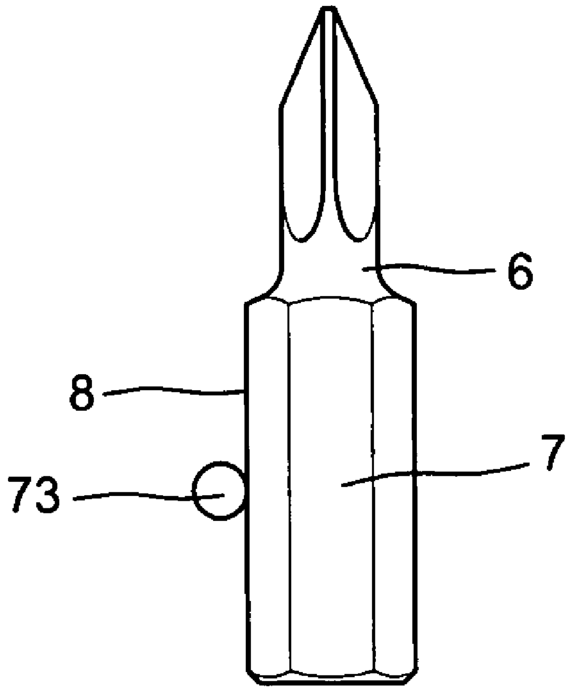
FIG. 26 is a perspective view to show that a screwdriver is checked by a steel ball.
Figure 27:
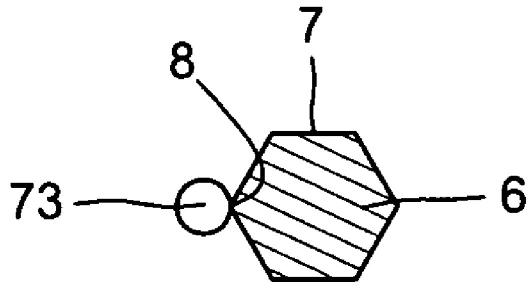
FIG. 27 is a cross section of FIG. 26.

The preferred embodiment and the alternate arrangement suit to use the screwdriver 6 (as shown in FIGS. 26 and 27)

which has no any annular groove or the rhombic notch in it, but only several plane surfaces 7 and several prisms 8 (turn a certain angle to make the radial hole 72 of the adapter 70 to have the radial hole facing to the prism of the screwdriver) which will obtain the expected result. Further, the conventional hexagon screwdriver, no matter it has or has not an annular groove or prism notch is also suitable to this embodiment or arrangement.

The present invention needs not to push the outer sleeve 71 upward, the screwdriver 1, 4 and 6 can be inserted into the adapter 70 by one hand. Meanwhile, the outer sleeve 71 slightly moves backward to follow the inserting action of the screwdriver 1, 4 and 6, the asymptotic line (arcuate surface) of the urgent wall 712 of the sleeve 71 presses the check means 73 of the adapter 70 to grip the screwdriver 1, 4 and 6 to position in the adapter 70. When push the sleeve 71 upward to a positioning point, the user can release his hand, the screwdriver 1, 4 and 6 left its retaining position a little distance and still gripped by the check means without breaking-off, the user can easily pick it up with one hand, either. The pushing up the outer sleeve 71 aims to prevent inadvertent touch of the sleeve 71 during operation that causes the removal of the screwdriver 1, 4 and 6. This improves the prior art pulling down the sleeve or inadvertently touch or hit on the sleeve 71 to cause the removal of the screwdriver 1, or to improve the prior art that push the sleeve up than couldn't leave the hand or to improve the prior art that after the check means releases the screwdriver 1, 4 and 6 which will breaking-off when put it upside down and/or to improve the prior art disadvantage that to insert the screwdriver 1, 4 and 6 must push up or pull down the sleeve.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. An adapter coupling device comprising:

an adapter having a polygonal recess in an upper portion, a cylindrical recess under the polygonal recess communicating with each other, a pair of first radial through holes in opposing upper peripheries, a detent disposed in at least one of said first radial through holes, a pair of second radial through holes in opposing lower peripheries receiving a pair of steel balls respectively, a first spring disposed in bottom of the cylindrical recess for biasing thereon a cylindrical positioning block which has a conical lower periphery to define an upper slope and a lower slope facing to the second radial through holes and a lower cylindrical groove in bottom of the cylindrical positioning bock for receiving the first spring, and a tang on lower end of said adapter to define a shoulder around top of the tang;

an outer sleeve wrapped on said adapter having an introrse portion on top in which is a asymptotic wall, an annular groove in an inner periphery engageable with the second steel balls, a plane surface and an annular flange on lower end sliding upon the tang; and a second spring wrapped on the tang and biased between the shoulder of the adapter and the flange of the outer sleeve.

2. The adapter as recited in claim 1, wherein said cylindrical positioning block has a circular groove in a top for receiving a magnet therein.

3. The adapter as recited in claim 1, further has a screwdriver having a hexagon shank a rhombic notch in the middle portion of each angle of the shank.

4. The adapter as recited in claim 1 wherein said detent comprises a pair of bullet-shaped means disposed respectively in said pair of first radial through holes in upper peripheries of said adapter having a small arc at inner end engageable with rhombic notches of the screwdriver and a large arc outer end position between said adapter and the asymptotic inner wall of said sleeve and to be squeezed by said asymptotic inner wall.

5. The adapter as recited in claim 1, wherein said detent comprises a W-shaped elastic ring disposed in between the upper portion of said adapter and the asymptotic wall of said sleeve, said elastic ring having a circumference larger than 180 degrees and a V-shaped retaining means disposed in one of the first radial through holes of said adapter and engageable with a rhombic notches of a screwdriver.

6. The adapter as recited in claim 1, wherein said detent comprises a pair of steel balls disposed respectively in said pair of first radial through holes.

* * * * *